(12) United States Patent
Makhotin

(10) Patent No.: US 10,255,601 B2
(45) Date of Patent: Apr. 9, 2019

(54) MULTIFACTOR AUTHENTICATION USING A DIRECTORY SERVER

(75) Inventor: Oleg Makhotin, Mississauga (CA)

(73) Assignee: Visa International Service Association, San Francisco, CA (US)

( * ) Notice: Subject to any disclaimer, the term of this patent is extended or adjusted under 35 U.S.C. 154(b) by 1346 days.

(21) Appl. No.: 12/964,446

(22) Filed: Dec. 9, 2010

(65) Prior Publication Data

US 2011/0208658 A1  Aug. 25, 2011

Related U.S. Application Data

(60) Provisional application No. 61/308,258, filed on Feb. 25, 2010.

(51) Int. Cl.
| | | |
|---|---|---|
| *G06Q 20/38* | (2012.01) | |
| *G06F 21/34* | (2013.01) | |
| *G06Q 20/12* | (2012.01) | |
| *G06Q 20/40* | (2012.01) | |
| *H04L 9/32* | (2006.01) | |

(52) U.S. Cl.
CPC .......... *G06Q 20/385* (2013.01); *G06F 21/34* (2013.01); *G06Q 20/12* (2013.01); *G06Q 20/40* (2013.01); *G06Q 20/401* (2013.01); *H04L 9/3213* (2013.01); *H04L 2209/56* (2013.01)

(58) Field of Classification Search
CPC ........ G06Q 20/00–20/425; G06F 21/00–21/88
USPC .................................................. 705/50–500
See application file for complete search history.

(56) References Cited

U.S. PATENT DOCUMENTS

| | | | |
|---|---|---|---|
| 5,379,344 A | | 1/1995 | Larsson et al. |
| 5,590,038 A | * | 12/1996 | Pitroda ........................ 705/41 |
| 5,613,012 A | | 3/1997 | Hoffman |
| 5,781,438 A | | 7/1998 | Lee |
| 5,883,810 A | | 3/1999 | Franklin |
| 5,953,710 A | | 9/1999 | Fleming |

(Continued)

FOREIGN PATENT DOCUMENTS

| | | |
|---|---|---|
| EP | 2156397 A1 | 2/2010 |
| WO | WO 1999/046881 A1 | 9/1999 |

(Continued)

OTHER PUBLICATIONS

International Search Report and Written Opinion dated Oct. 19, 2011 for International PCT Application No. PCT/US2011/025899, 11 pages.

(Continued)

*Primary Examiner* — Mohammad A. Nilforoush
(74) *Attorney, Agent, or Firm* — Kilpatrick Townsend & Stockton LLP

(57) ABSTRACT

A method and a server computer are provided for authenticating a cardholder account. The server computer implements the method, which includes obtaining a first identifier and a cryptogram from a first entity, identifying an issuer associated with the cardholder account, forwarding the first account identifier and the cryptogram to a second entity for validation, receiving a second identifier from the second entity, and sending the second identifier to the first entity. The first identifier can be associated with the cardholder account. The second identifier can be generated by the second entity and associated with a validated form of the first identifier.

20 Claims, 6 Drawing Sheets

(56) References Cited

U.S. PATENT DOCUMENTS

| | | |
|---|---|---|
| 5,956,699 A | 9/1999 | Wong |
| 6,000,832 A | 12/1999 | Franklin |
| 6,014,635 A | 1/2000 | Harris |
| 6,016,476 A | 1/2000 | Maes et al. |
| 6,044,360 A | 3/2000 | Picciallo |
| 6,163,771 A | 12/2000 | Walker |
| 6,227,447 B1 | 5/2001 | Campisano |
| 6,236,981 B1 | 5/2001 | Hill |
| 6,267,292 B1 | 7/2001 | Walker |
| 6,327,578 B1 | 12/2001 | Linehan |
| 6,341,724 B2 | 1/2002 | Campisano |
| 6,422,462 B1 | 7/2002 | Cohen |
| 6,425,523 B1 | 7/2002 | Shem Ur |
| 6,592,044 B1 | 7/2003 | Wong |
| 6,636,833 B1 | 10/2003 | Flitcroft |
| 6,748,367 B1 | 6/2004 | Lee |
| 6,805,287 B2 | 10/2004 | Bishop |
| 6,879,965 B2 | 4/2005 | Fung |
| 6,901,387 B2 | 5/2005 | Wells |
| 6,931,382 B2 | 8/2005 | Laage |
| 6,938,019 B1 | 8/2005 | Uzo |
| 6,941,285 B2 | 9/2005 | Sarcanin |
| 6,980,670 B1 | 12/2005 | Hoffman |
| 6,990,470 B2 | 1/2006 | Hogan |
| 6,991,157 B2 | 1/2006 | Bishop |
| 7,007,840 B2 | 3/2006 | Davis |
| 7,051,929 B2 | 5/2006 | Li |
| 7,069,249 B2 | 6/2006 | Stolfo |
| 7,103,576 B2 | 9/2006 | Mann, III |
| 7,113,930 B2 | 9/2006 | Eccles |
| 7,136,835 B1 | 11/2006 | Flitcroft |
| 7,177,835 B1 | 2/2007 | Walker |
| 7,177,848 B2 | 2/2007 | Hogan |
| 7,194,437 B1 | 3/2007 | Britto |
| 7,264,154 B2 | 9/2007 | Harris |
| 7,287,692 B1 | 10/2007 | Patel |
| 7,292,999 B2 | 11/2007 | Hobson |
| 7,350,230 B2 | 3/2008 | Forrest |
| 7,353,382 B2 | 4/2008 | Labrou |
| 7,379,919 B2 | 5/2008 | Hogan |
| RE40,444 E | 7/2008 | Linehan |
| 7,412,420 B2 | 8/2008 | Holdsworth |
| 7,415,443 B2 | 8/2008 | Hobson |
| 7,444,676 B1 | 10/2008 | Asghari-Kamrani |
| 7,469,151 B2 | 12/2008 | Khan |
| 7,543,738 B1 * | 6/2009 | Saunders et al. ............. 235/380 |
| 7,548,889 B2 | 6/2009 | Bhambri |
| 7,567,934 B2 | 7/2009 | Flitcroft |
| 7,567,936 B1 | 7/2009 | Peckover |
| 7,571,139 B1 | 8/2009 | Giordano |
| 7,571,142 B1 | 8/2009 | Flitcroft |
| 7,580,898 B2 | 8/2009 | Brown |
| 7,584,153 B2 | 9/2009 | Brown |
| 7,593,896 B1 | 9/2009 | Flitcroft |
| 7,606,560 B2 | 10/2009 | Labrou |
| 7,627,531 B2 | 12/2009 | Breck |
| 7,627,895 B2 | 12/2009 | Gifford |
| 7,650,314 B1 | 1/2010 | Saunders |
| 7,685,037 B2 | 3/2010 | Reiners |
| 7,702,578 B2 | 4/2010 | Fung |
| 7,707,120 B2 | 4/2010 | Dominguez |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II |
| 7,784,685 B1 | 8/2010 | Hopkins, III |
| 7,793,851 B2 | 9/2010 | Mullen |
| 7,801,826 B2 | 9/2010 | Labrou |
| 7,805,376 B2 | 9/2010 | Smith |
| 7,805,378 B2 | 9/2010 | Berardi |
| 7,828,220 B2 | 11/2010 | Mullen |
| 7,835,960 B2 | 11/2010 | Breck |
| 7,841,523 B2 | 11/2010 | Oder, II |
| 7,841,539 B2 | 11/2010 | Hewton |
| 7,844,550 B2 | 11/2010 | Walker |
| 7,849,020 B2 | 12/2010 | Johnson |
| 7,853,529 B1 | 12/2010 | Walker |
| 7,853,995 B2 | 12/2010 | Chow |
| 7,865,414 B2 | 1/2011 | Fung |
| 7,873,579 B2 | 1/2011 | Hobson |
| 7,873,580 B2 | 1/2011 | Hobson |
| 7,890,393 B2 | 2/2011 | Talbert |
| 7,891,563 B2 | 2/2011 | Oder, II |
| 7,896,238 B2 | 3/2011 | Fein |
| 7,922,082 B2 | 4/2011 | Muscato |
| 7,931,195 B2 | 4/2011 | Mullen |
| 7,938,318 B2 | 5/2011 | Fein |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders |
| 8,046,256 B2 | 10/2011 | Chien |
| 8,060,448 B2 | 11/2011 | Jones |
| 8,060,449 B1 | 11/2011 | Zhu |
| 8,074,877 B2 | 12/2011 | Mullen |
| 8,074,879 B2 | 12/2011 | Harris |
| 8,082,210 B2 | 12/2011 | Hansen |
| 8,095,113 B2 | 1/2012 | Kean |
| 8,104,679 B2 | 1/2012 | Brown |
| RE43,157 E | 2/2012 | Bishop |
| 8,109,436 B1 | 2/2012 | Hopkins, III |
| 8,121,942 B2 | 2/2012 | Carlson |
| 8,121,956 B2 | 2/2012 | Carlson |
| 8,126,449 B2 | 2/2012 | Beenau |
| 8,171,525 B1 | 5/2012 | Pelly |
| 8,196,813 B2 | 6/2012 | Vadhri |
| 8,205,791 B2 | 6/2012 | Randazza |
| 8,224,702 B2 | 7/2012 | Mengerink |
| 8,225,385 B2 | 7/2012 | Chow |
| 8,265,993 B2 | 9/2012 | Chien |
| 8,280,777 B2 | 10/2012 | Mengerink |
| 8,328,095 B2 | 12/2012 | Oder, II |
| 8,376,225 B1 | 2/2013 | Hopkins, III |
| 8,380,177 B2 | 2/2013 | Laracey |
| 8,387,873 B2 | 3/2013 | Saunders |
| 8,401,539 B2 | 3/2013 | Beenau |
| 8,401,898 B2 | 3/2013 | Chien |
| 8,403,211 B2 | 3/2013 | Brooks |
| 8,412,623 B2 | 4/2013 | Moon |
| 8,412,837 B1 | 4/2013 | Emigh |
| 8,417,642 B2 | 4/2013 | Oren |
| 8,447,699 B2 | 5/2013 | Batada |
| 8,453,223 B2 | 5/2013 | Svigals |
| 8,453,925 B2 | 6/2013 | Fisher |
| 8,458,487 B1 | 6/2013 | Palgon |
| 8,484,134 B2 | 7/2013 | Hobson |
| 8,485,437 B2 | 7/2013 | Mullen |
| 8,494,959 B2 | 7/2013 | Hathaway |
| 8,498,908 B2 | 7/2013 | Mengerink |
| 8,504,478 B2 | 8/2013 | Saunders |
| 8,510,816 B2 | 8/2013 | Quach |
| 8,538,845 B2 | 9/2013 | Liberty |
| 8,555,079 B2 | 10/2013 | Shablygin |
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |

(56) References Cited

U.S. PATENT DOCUMENTS

| | | |
|---|---|---|
| 8,651,374 B2 | 2/2014 | Brabson |
| 8,656,180 B2 | 2/2014 | Shablygin |
| 2001/0029485 A1 | 10/2001 | Brody |
| 2001/0034720 A1 | 10/2001 | Armes |
| 2001/0054003 A1 | 12/2001 | Chien |
| 2002/0007320 A1 | 1/2002 | Hogan |
| 2002/0016749 A1 | 2/2002 | Borecki |
| 2002/0029193 A1 | 3/2002 | Ranjan |
| 2002/0035548 A1 | 3/2002 | Hogan |
| 2002/0073045 A1 | 6/2002 | Rubin |
| 2002/0116341 A1 | 8/2002 | Hogan |
| 2002/0133467 A1 | 9/2002 | Hobson |
| 2002/0147913 A1 | 10/2002 | Lun Yip |
| 2002/0194138 A1 | 12/2002 | Dominguez et al. |
| 2003/0028481 A1 | 2/2003 | Flitcroft |
| 2003/0115126 A1* | 6/2003 | Pitroda ............... 705/36 |
| 2003/0130955 A1 | 7/2003 | Hawthorne |
| 2003/0191709 A1 | 10/2003 | Elston |
| 2003/0191945 A1 | 10/2003 | Keech |
| 2003/0200184 A1* | 10/2003 | Dominguez et al. ........... 705/78 |
| 2003/0212642 A1 | 11/2003 | Weller et al. |
| 2004/0010462 A1 | 1/2004 | Moon |
| 2004/0050928 A1 | 3/2004 | Bishop |
| 2004/0059682 A1 | 3/2004 | Hasumi |
| 2004/0093281 A1 | 5/2004 | Silverstein |
| 2004/0107170 A1* | 6/2004 | Labrou et al. ............... 705/64 |
| 2004/0139008 A1 | 7/2004 | Mascavage |
| 2004/0143532 A1 | 7/2004 | Lee |
| 2004/0158532 A1 | 8/2004 | Breck |
| 2004/0210449 A1 | 10/2004 | Breck |
| 2004/0210498 A1 | 10/2004 | Freund |
| 2004/0232225 A1 | 11/2004 | Bishop |
| 2004/0260646 A1* | 12/2004 | Berardi et al. ............... 705/39 |
| 2005/0033703 A1* | 2/2005 | Holdsworth ............... 705/67 |
| 2005/0036611 A1 | 2/2005 | Seaton |
| 2005/0037735 A1 | 2/2005 | Coutts |
| 2005/0077349 A1* | 4/2005 | Bonalle et al. ............... 235/380 |
| 2005/0080730 A1 | 4/2005 | Sorrentino |
| 2005/0108178 A1 | 5/2005 | York |
| 2005/0132194 A1* | 6/2005 | Ward ............... 713/176 |
| 2005/0187873 A1* | 8/2005 | Labrou et al. ............... 705/40 |
| 2005/0199709 A1 | 9/2005 | Linlor |
| 2005/0246278 A1* | 11/2005 | Gerber et al. ............... 705/44 |
| 2005/0246293 A1 | 11/2005 | Ong |
| 2005/0269401 A1 | 12/2005 | Spitzer |
| 2005/0269402 A1 | 12/2005 | Spitzer |
| 2006/0179007 A1* | 8/2006 | Davis ............... 705/67 |
| 2006/0235795 A1 | 10/2006 | Johnson |
| 2006/0237528 A1 | 10/2006 | Bishop |
| 2006/0278704 A1 | 12/2006 | Saunders |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |
| 2007/0170245 A1* | 7/2007 | Elbaum ............... G06Q 20/04 235/380 |
| 2007/0170247 A1 | 7/2007 | Friedman |
| 2007/0179885 A1 | 8/2007 | Bird |
| 2007/0198432 A1* | 8/2007 | Pitroda et al. ............... 705/64 |
| 2007/0208671 A1* | 9/2007 | Brown ............... G06Q 20/341 705/65 |
| 2007/0245414 A1 | 10/2007 | Chan |
| 2007/0257103 A1* | 11/2007 | Fisher et al. ............... 235/380 |
| 2007/0288377 A1 | 12/2007 | Shaked |
| 2007/0291995 A1 | 12/2007 | Rivera |
| 2008/0015988 A1 | 1/2008 | Brown |
| 2008/0029607 A1 | 2/2008 | Mullen |
| 2008/0035738 A1 | 2/2008 | Mullen |
| 2008/0048022 A1* | 2/2008 | Vawter ............... 235/380 |
| 2008/0051122 A1* | 2/2008 | Fisher ............... 455/466 |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0120214 A1 | 5/2008 | Steele et al. |
| 2008/0154770 A1* | 6/2008 | Rutherford et al. ............ 705/44 |
| 2008/0177826 A1* | 7/2008 | Pitroda ............... 709/203 |
| 2008/0195550 A1* | 8/2008 | Smith ............... 705/72 |
| 2008/0201264 A1 | 8/2008 | Brown |
| 2008/0201265 A1 | 8/2008 | Hewton |
| 2008/0228646 A1 | 9/2008 | Myers |
| 2008/0243702 A1 | 10/2008 | Hart |
| 2008/0245855 A1 | 10/2008 | Fein |
| 2008/0245861 A1 | 10/2008 | Fein |
| 2008/0283591 A1 | 11/2008 | Oder, II |
| 2008/0302869 A1 | 12/2008 | Mullen |
| 2008/0302876 A1 | 12/2008 | Mullen |
| 2009/0006262 A1 | 1/2009 | Brown |
| 2009/0010488 A1 | 1/2009 | Matsuoka |
| 2009/0030845 A1* | 1/2009 | Hurry et al. ............... 705/71 |
| 2009/0037333 A1 | 2/2009 | Flitcroft |
| 2009/0037982 A1 | 2/2009 | Wentker et al. |
| 2009/0043702 A1 | 2/2009 | Bennett |
| 2009/0048971 A1 | 2/2009 | Hathaway |
| 2009/0106112 A1 | 4/2009 | Dalmia |
| 2009/0106160 A1 | 4/2009 | Skowronek |
| 2009/0134217 A1 | 5/2009 | Flitcroft |
| 2009/0144202 A1* | 6/2009 | Hurry ............... 705/67 |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0193511 A1 | 7/2009 | Noe et al. |
| 2009/0198618 A1* | 8/2009 | Chan et al. ............... 705/66 |
| 2009/0200371 A1* | 8/2009 | Kean et al. ............... 235/379 |
| 2009/0248581 A1* | 10/2009 | Brown ............ G06K 19/06187 705/67 |
| 2009/0248583 A1 | 10/2009 | Chhabra |
| 2009/0254440 A1* | 10/2009 | Pharris ............... 705/17 |
| 2009/0276347 A1 | 11/2009 | Kargman |
| 2009/0294524 A1* | 12/2009 | Rice et al. ............... 235/380 |
| 2009/0294527 A1 | 12/2009 | Brabson |
| 2009/0307139 A1 | 12/2009 | Mardikar |
| 2009/0308921 A1 | 12/2009 | Mullen |
| 2009/0327131 A1 | 12/2009 | Beenau |
| 2010/0008535 A1 | 1/2010 | Abulafia |
| 2010/0063895 A1* | 3/2010 | Dominguez et al. ............ 705/26 |
| 2010/0088237 A1 | 4/2010 | Wankmueller |
| 2010/0094755 A1 | 4/2010 | Kloster |
| 2010/0106644 A1 | 4/2010 | Annan |
| 2010/0114776 A1 | 5/2010 | Weller |
| 2010/0120408 A1 | 5/2010 | Beenau |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1* | 7/2010 | Royyuru ............ G06Q 20/04 705/67 |
| 2010/0211505 A1 | 8/2010 | Saunders |
| 2010/0223186 A1 | 9/2010 | Hogan |
| 2010/0228668 A1* | 9/2010 | Hogan et al. ............... 705/41 |
| 2010/0235284 A1 | 9/2010 | Moore |
| 2010/0258620 A1 | 10/2010 | Torreyson |
| 2010/0291904 A1 | 11/2010 | Musfeldt |
| 2010/0293381 A1* | 11/2010 | Hammad ............... 713/172 |
| 2010/0306076 A1 | 12/2010 | Taveau |
| 2010/0325041 A1 | 12/2010 | Berardi |
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0119155 A1 | 5/2011 | Hammad et al. |
| 2011/0125597 A1 | 5/2011 | Oder, II |
| 2011/0153437 A1 | 6/2011 | Archer |
| 2011/0154466 A1 | 6/2011 | Harper |
| 2011/0161233 A1 | 6/2011 | Tieken |
| 2011/0191244 A1 | 8/2011 | Dai |
| 2011/0208658 A1 | 8/2011 | Makhotin |

(56) References Cited

U.S. PATENT DOCUMENTS

| | | |
|---|---|---|
| 2011/0238511 A1 | 9/2011 | Park |
| 2011/0238573 A1 | 9/2011 | Varadarajan |
| 2011/0246317 A1 | 10/2011 | Coppinger |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2012/0018506 A1 | 1/2012 | Hammad et al. |
| 2012/0028609 A1 | 2/2012 | Hruska |
| 2012/0035998 A1 | 2/2012 | Chien |
| 2012/0041881 A1 | 2/2012 | Basu |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0116902 A1 | 5/2012 | Cardina |
| 2012/0116976 A1 | 5/2012 | Hammad |
| 2012/0123882 A1 | 5/2012 | Carlson |
| 2012/0123940 A1 | 5/2012 | Killian |
| 2012/0129514 A1 | 5/2012 | Beenau |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2013/0017784 A1 | 1/2013 | Fisher |
| 2013/0019098 A1 | 1/2013 | Gupta |
| 2013/0054337 A1 | 2/2013 | Brendell |
| 2013/0054466 A1 | 2/2013 | Muscato |
| 2013/0054474 A1 | 2/2013 | Yeager |
| 2013/0081122 A1 | 3/2013 | Svigals |
| 2013/0091028 A1 | 4/2013 | Oder ("J.D."), II |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159178 A1 | 6/2013 | Colon |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191286 A1 | 7/2013 | Cronic |
| 2013/0191289 A1 | 7/2013 | Cronic |
| 2013/0198071 A1 | 8/2013 | Jurss |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212666 A1 | 8/2013 | Mattsson |
| 2013/0218698 A1 | 8/2013 | Moon |
| 2013/0226813 A1 | 8/2013 | Voltz |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0052532 A1 | 2/2014 | Tsai |
| 2014/0052620 A1 | 2/2014 | Rogers |
| 2014/0052637 A1 | 2/2014 | Jooste |

FOREIGN PATENT DOCUMENTS

| | | |
|---|---|---|
| WO | 2001035304 A1 | 5/2001 |
| WO | 2001035304 A9 | 5/2001 |
| WO | 2004042536 A2 | 5/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |

(56) References Cited

FOREIGN PATENT DOCUMENTS

| WO | 2013056104 A1 | 4/2013 |
| WO | 2013119914 A1 | 8/2013 |
| WO | 2013179271 A2 | 12/2013 |

OTHER PUBLICATIONS

U.S. Appl. No. 61/258,194 entitled, "Apparatuses, Methods, and Systems Pertaining to the Verification of Portable Consumer Devices for 3-D Secure Services," filed Nov. 4, 2009, 147 pages.

* cited by examiner

MULTIFACTOR AUTHENTICATION USING A DIRECTORY SERVER

The present application is a non-provisional of and claims benefit under 35 U.S.C. § 119(e) of U.S. Provisional Patent Application No. 61/308,258, entitled "MultiFactor Authentication Using Directory Server", filed Feb. 25, 2010, which is hereby incorporated by reference in its entirety for all purposes.

BACKGROUND

Online transactions have increased in recent years as the use of the Internet has become common. Due to the abundance of hackers, many methods have been implemented to ensure a secure transaction. Some of these methods included requiring additional information about the cardholder (i.e., address, zip code, phone number), while recent methods require the additional entry of a card verification value (CVV). Such methods provide some security to cardholders, especially when preventing fraudulent charges by persons not in possession of the physical portable consumer device.

Additional security methods can also be performed unbeknownst to the user of the portable consumer device. Such methods may include protocols such as Visa's 3D Secure™ implemented in the Verified by Visa™ (VBV) service. The 3-D Secure™ method allows for the additional verification of the portable consumer device and the user of the device by prompting the user to enter password/code during a transaction. For example, when completing a transaction on a merchant website, an additional window can pop up and require entry of the password. This password is only known by the user and the issuer. The additional prompt and verification can be controlled by third parties.

However, some fraudsters are still able to obtain this information through phishing, especially when multiple third parties are controlling the communication between the merchant, user, and issuer during verification of the user and authorization of the transaction.

Embodiments of the invention address these and other problems, individually and collectively.

BRIEF SUMMARY

One embodiment provides a method for authenticating a cardholder account. The method includes obtaining a first identifier and a cryptogram from a first entity, identifying an issuer associated with the cardholder account, forwarding the first account identifier and the cryptogram to a second entity for validation, receiving a second identifier from the second entity, and sending the second identifier to the first entity. The first identifier can be associated with the cardholder account. The second identifier can be generated by the second entity and associated with a validated form of the first identifier.

The method can be performed on a directory server computer. The first identifier can include a primary account number (PAN) and/or any one or more of an electronic mail address, a telephone number, a card authentication program (CAP) token, a dynamic passcode authentication (DPA) token, or a one time passcode (OTP) cryptogram.

The method further can further include consulting a lookup table to retrieve a primary account number (PAN) associated with the first identifier. The first entity can be an access device. The access device can be coupled to a reader that reads the first identifier from a portable consumer device. The reader can include a merchant plug in (MPI). The second entity can be an access control server computer associated with the issuer.

The method can further include entering a third identifier associated with the portable consumer device. The third identifier can be received by the issuer in order to continue validation of the cardholder account. The second identifier can be any one of a temporary primary account number (TPAN) or cardholder authentication verification value (CAVV). The merchant plug in (MPI) can communicate with the reader to populate browser fields in a browser on the access device with a primary account number (PAN) and the card authentication verification value (CAVV) or the temporary primary account number (TPAN).

The method can further include sending the primary account number (PAN) and the card authentication verification value (CAVV) or the temporary primary account number (TPAN) to an acquirer. The acquirer can forward the primary account number and the card authentication verification value (CAVV) to the issuer via a payment processing network for authorization of a transaction.

Another embodiment provides a server computer for use in an authenticated transaction. The server computer includes a processor and a computer readable medium coupled to the processor. The computer readable medium can include code which is executable by the processor to implement a method. The method can include receiving a first identifier and a cryptogram from an access device, identifying an issuer associated with the first identifier, sending the first identifier and the cryptogram to the issuer for validation, receiving a second identifier from the issuer, and providing the second identifier to the access device. The second identifier can be associated with a validated form of the first identifier. The access device can communicate the second identifier to a merchant to complete the authenticated transaction.

The access device can be coupled to a reader and can receive the first identifier and cryptogram from a portable consumer device through any one of a contact interface or a contactless interface. The reader can be a universal serial bus dongle capable of interfacing with a portable consumer device. The reader can further include a software module with a merchant plug in.

The server computer can further include a database having information used to identify an issuer associated with the first identifier. The first identifier can be a primary account number.

Yet another embodiment provides a computer readable medium having code executable by a processor for implementing a method. The method includes obtaining a first identifier and a cryptogram from a first entity, identifying an issuer associated with the cardholder account, forwarding the first account identifier and the cryptogram to a second entity for validation, receiving a second identifier from the second entity, and sending the second identifier to the first entity. The first identifier can be associated with the cardholder account. The second identifier can be generated by the second entity and associated with a validated form of the first identifier.

A further embodiment provides a method for authenticating a transaction on an access device. The method includes accessing a merchant website, initiating a transaction on the merchant website, interfacing the access device with a reader, forwarding a first identifier and a cryptogram to a directory server through a merchant plug in, receiving a second identifier through the MPI, and communicating the second identifier to the reader from the MPI. The merchant can send a request for payment during the transaction. The reader can capture the first identifier stored on a portable consumer device and the cryptogram in response to the request for payment. The directory server can communicate the first identifier and the cryptogram to an issuer of the portable consumer device for validation. The second identifier can be associated with the validated first identifier.

These and other embodiments of the invention are described in further detail below.

DETAILED DESCRIPTION

Figure 1:
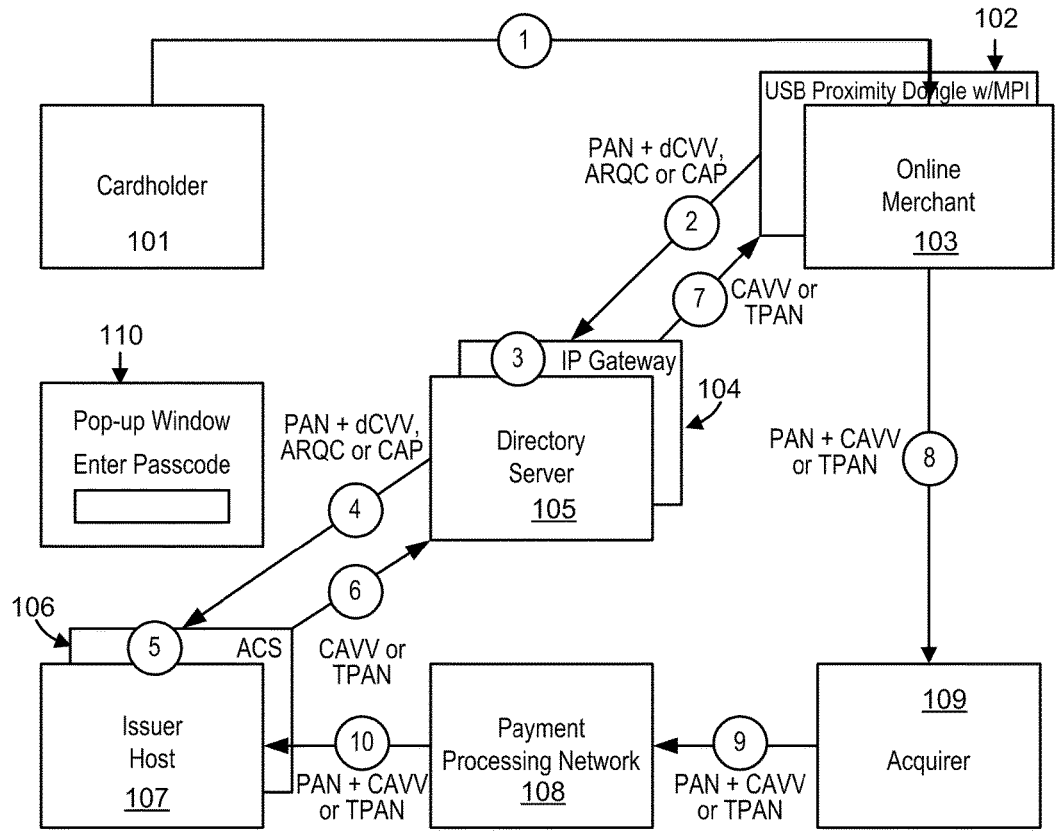
FIG. 1 shows a transaction flow for authenticating a transaction in one embodiment.

Systems and methods for providing multiple levels of authentication during an online transaction are disclosed. Using an access device, a user visits a merchant website that implements a merchant plug in (MPI) and completes a checkout process to make a purchase. At checkout, the user is prompted to wave his portable consumer device (e.g., a payment card) by a reader, coupled to an access device (e.g., a portable computer, a phone, etc.). The reader reads information in the portable consumer device, which includes a cryptogram, and other information (e.g., a first identifier) such as an account number, expiration date, and a service code. The cryptogram can be generated by the portable consumer device. The captured portable consumer device information and cryptogram are forwarded from a first entity (i.e., an access device) to a directory server through the MPI. The directory server identifies a second entity (e.g., issuer) associated with the portable consumer device and forwards the portable consumer device information to the second entity. The second entity validates the portable consumer device information and the cryptogram. In addition, the second entity may require another form of validation, such as a passcode, from the user of the portable consumer device.

After validation, the second entity generates a temporary identifier (e.g., a second identifier) corresponding to the validated portable consumer device information. This temporary identifier is sent to the directory server, which securely forwards the temporary identifier to the MPI. The MPI communicates the temporary identifier to the access device. The access device then provides the information associated with the temporary identifier and the temporary identifier to the merchant at the online checkout.

A usual transaction flow then commences: the merchant sends the transaction information including the temporary identifier to an acquirer, the acquirer submits the transaction information to a payment processing server, the payment processing server in a payment processing network determines the issuer associated with the portable consumer device and forwards the transaction information to the issuer. Finally, the issuer validates the transaction information, including the temporary identifier, and authorizes the transaction if the transaction is to be authorized (e.g., there is sufficient credit or funds to conduct the transaction).

An enhancement from offering the aforementioned multifactor authentication is that a user can use an alias, or first identifier, such as an electronic mail (email) address, telephone number, username, or a similar type of known user information, to access their primary account number (PAN). Accordingly, the user does not need to remember their full PAN or other card information in order to use the card during a transaction, but can still be assured the same level of security during an online transactions. Accordingly, this can improve cardholder experience during live online transactions.

A second enhancement of the multifactor authentication is the cryptogram, which offers added security during on online transaction. For each transaction, a unique cryptogram is generated. The cryptogram can be generated on the portable consumer device or, alternatively, on the access device. Accordingly, if the portable consumer device information, the first identifier of the user, or any other information regarding the account is remotely stolen during an online transaction, a fraudster is unable to complete any future transaction if the card is not present. In another embodiment, the cryptogram can be passed through the network by special access device, such as a chip reader to the user's computer, or can manually be entered if no access device is available to the user.

The multi-factor authentication system can be implemented on a known platform, such as Visa's 3-D Secure platform, allowing the embodiments the system to be more acceptable to users. Additionally, utilizing the multifactor authentication system not only allows for added protection against counterfeit and lost/stolen online fraud, but also shifts liability of possible fraud to the issuers and away from the merchants both in face-to-face transactions and in on-line transactions. This is because the same validation mechanisms (dCVV, ARQC or CAP/DPA validation) can be implemented in both face-to-face and online environments.

Exemplary systems and methods using this process for authenticating an online transaction are provided below.

I. Exemplary Systems

Figure 2:
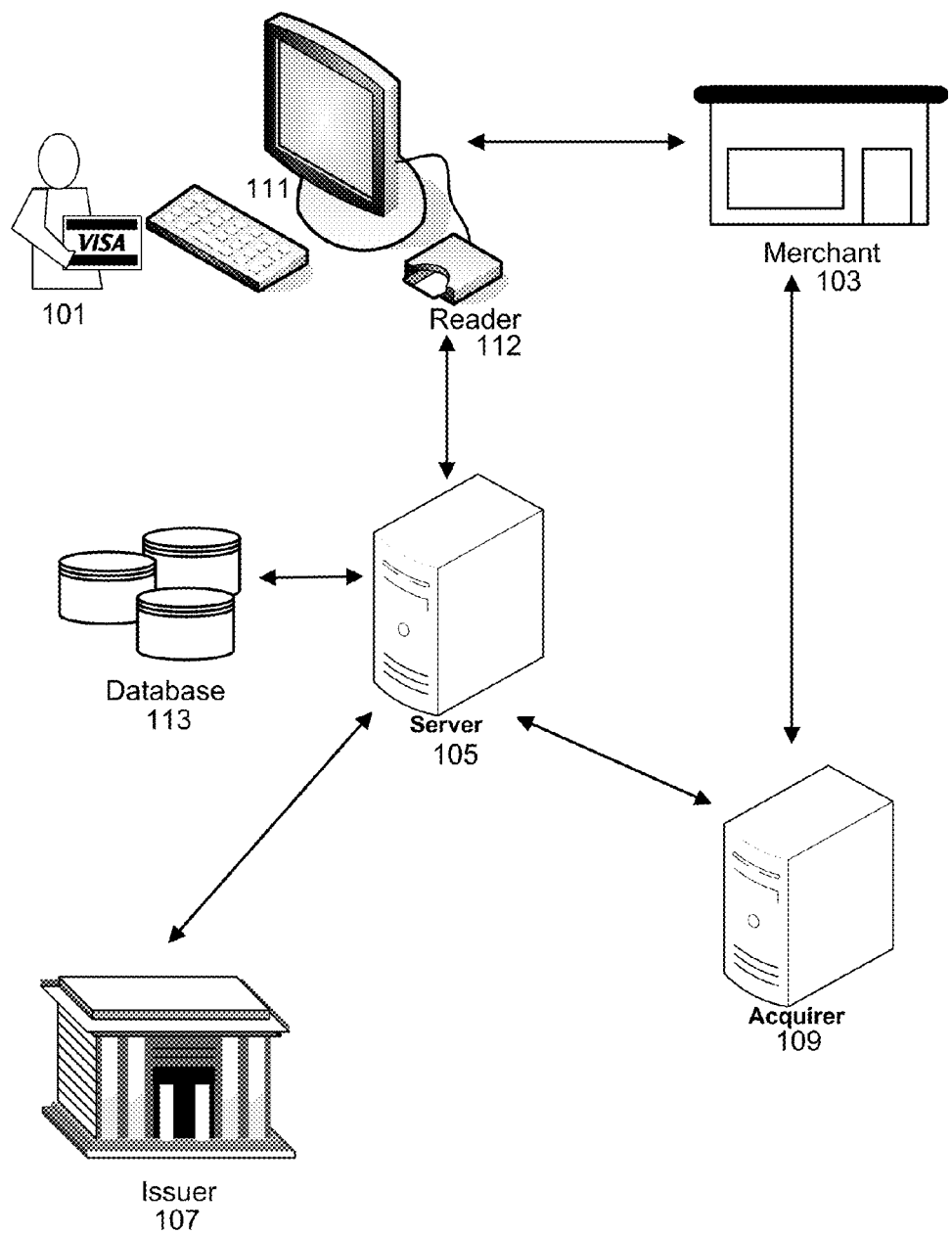
FIG. 2 shows a system for implementing the transaction flow of FIG. 1.

A system according to an embodiment of the invention is shown in FIGS. 1-2.

FIG. 1 illustrates a transaction flow in a system for authenticating a transaction. The transaction flow includes steps 1-10 which show the steps of authentication during an online transaction. As described within embodiments below, Visa's 3-D Secure technology is implemented in conjunction with the present invention. However, it should be understood that the present invention can be implemented in other transactional security systems that do not utilize Visa's 3-D Secure technology.

In step (1), a user, can browse an online merchant website and can purchase a good or service. A proximity reader, such as a contact chip USB dongle (e.g., a payWave or other card reader able to capture a dCVV or ARQC or a CAP/DPA token cryptogram), is interfaced with an access device, such as a client computer or a cardholder's personal computer (PC) or handheld computer (e.g., SmartPhone). The user can then install software on the reader or on the access device with a merchant plug in (MPI). The MPI allows the user to securely connect to an IP gateway (e.g. using session keys) with his/her access device.

In step (2), when initiating a transaction (i.e., completing a purchase through check-out), the cardholder is prompted to wave their portable consumer device, or payment card (e.g., a Visa payWave card or other type of portable consumer device such as a phone, key fob, etc.) across the proximity reader, (e.g., USB payWave or EMV chip reader), which captures the PAN and a cryptogram (dCVV or ARQC or CAP/DPA token) from the card. The MPI receives the portable consumer device information and the cryptogram through the reader, the MPI then communicates the information to an internet protocol (IP) Gateway 104. As discussed previously, the Visa 3DS protocol can be utilized to perform this secure communication.

The cryptogram can be a dynamic card verification value (dCVV), application request cryptogram (ARQC), card authentication program (CAP) token or dynamic passcode authentication (DPA) token or a similar type of cryptographic data. The cryptogram may be generated on the card each time a transaction occurs. In some embodiments, the user may need to enter the card's personal identification number (PIN) in order to generate the cryptogram. Alternatively, the cryptogram may be generated by the access device and passed to the MPI, or manually entered by the user during each transaction. If the cryptogram is manually entered, it can be generated by a secondary device, such as a DPA reader or one time passcode (OTP) generator. A OTP generator is a device able to generate one time passcodes that are synchronized with the issuer host values.

In step (3), the IP Gateway communicates the first identifier and cryptogram (e.g., PAN, dCVV/ARQC/CAP token and other data) to the directory server.

In step (4), the portable consumer device information, including the primary account number and cryptogram, is utilized by the directory server to identify an issuing entity (host). This can be done through referencing a database coupled to the directory server. When the issuer host is identified, the directory server 105 forwards the portable consumer device information to the ACS 106 associated with the issuer 107.

In step (5), the ACS then communicates the portable consumer device information (e.g., the cryptogram (dCVV or ARQC or CAP) and other required data) to the issuer host for validation through the personal account number (PAN) and cryptogram generated by the portable consumer device during the transaction. This is a first factor of authentication.

A pop-up window 110 can be also generated by the issuer host 107 and made visible to the user through the web browser of the access device on which the user is performing an online transaction. This is a second factor of authentication. If the passcode is incorrect, the user's online transaction session can timeout and the transaction can be terminated. If the user enters a correct passcode, the issuer can continue the validation process.

In step (6), during the validation process, the issuer host can generate a second identifier associated with the portable consumer device. The second identifier can include a temporary personal account number or CAVV or other type of data which is both dynamic and unique for each transaction and can be used to the complete the transaction. In this way, the user's actual personal account number associated with the portable consumer device never needs to be entered to complete the online transaction. Once the second identifier is generated, it is sent to the directory server from the issuer host 107 through the ACS 106. The second identifier is associated with the validated payment information of the portable consumer device.

In step (7), the directory server forwards the second identifier (e.g., CAVV or TPAN) via the Visa IP Gateway or other secure IP Gateway, to the MPI. When the MPI receives the second identifier, the MPI can communicate this information to the reader. The reader can include software which is then used to populate the web browser fields provided to the user during checkout, such as a self form-complete function. The fields may include user information, such as billing and shipping information as well as payment information. Once the merchant required information is completed, the user can complete checkout.

In step (8), the user's payment information is then submitted to the merchant, who forwards the information (e.g., PAN with CAVV or TPAN) to an acquirer for processing and authorization of the transaction. The payment information may include both the user's personal account number and the second identifier, though the second identifier is the only number visible to the user in the populated fields of the browser. In another embodiment, the second identifier may not even be visible to the user although the information is provided to the merchant in order to authorize the transaction.

In step (9) of FIG. 1, the payment information and any other information associated with the transaction is The acquirer submits the transaction to a payment processing network (e.g., VisaNet). In alternative embodiments, the payment processing network is not used and information is sent directly to the issuer 107 by the acquirer 109. In still another embodiment, the acquirer is not utilized and the merchant directly forward the PAN and CAVV or TPAN directly to the payment processing network. The payment information can be sent through a network 108, such as the Internet, via a hard-wired or wireless connection. The network may be a wireless local area network (WLAN), local area network (LAN) or cellular network such as EV-DO, 3G, 4G or other network known in the art which can securely communicate data between two entities.

In step (10) of FIG. 1, the issuer receives the authorization request from the acquirer 109 through a network 108. The issuer can authorize the transaction by validating the previously generated second identifier (i.e., the issuer validates the CAVV or TPAN generated at step (6)). If the second identifier matches the previously created second identifier by the issuer, the transaction is validated and an authorization response is sent the acquirer. If the second identifier does not match the second identifier which the issuer has previously generated, the transaction is denied.

Referring now to FIG. 2, an exemplary embodiment is illustrated of a system which can be used to implement the transaction flow of FIG. 1. As previously discussed, a user 101 can be shopping on a merchant website on an access device 111 in communication with the world wide web (WWW).

The "merchant" 103 is typically an entity that engages in transactions and can sell goods or services. The user 101 is the owner of an account associated with a portable consumer device. A user can also be referred to as cardholder, account holder, or similar term. The access device 111 can be a laptop computer, personal computer or cellular telephone, such as a Smartphone, PDA, or a similar type of device having internet capabilities via a wired or wireless connection. The access device 111 can additionally be coupled with a reader 112, such as a card reader, through an interface. The interface can be a wired interface (shown), such as a universal serial bus (USB) connection, or a wireless interface, such as WiFi, WLAN or Bluetooth. In some embodiments, the reader may be incorporated into the access device.

The reader 112 can be in the form of a USB dongle 102, or other module which can be coupled to an access device 111. The reader can be coupled to the access device via wired or wireless connection. The reader can include merchant plug in (MPI) software, which offers compatibility with the online merchant who also implements the MPI software functionality. The MPI essentially opens a gateway which allows for direct communication between the reader, access device, user and a directory server, such as Visa Directory Server (VDS) over the network.

When the user 101 proceeds to "checkout" to purchase an item on a merchant website, the user 101 can couple a portable consumer device to the reader 112. A portable consumer device can be a credit card, debit card, gift card, gift certificate or any other similar physical portable consumer device that has an associated value and is associated with the user. The portable consumer device can come in contact with the reader 112, or wirelessly communicate payment information to the reader 112. In some embodiments, the user can enter the portable consumer device information to the MPI manually through an interface such as a keyboard on the access device. The portable consumer device, reader, or another third party source in communication with the user's access device 111, can generate a cryptogram associated with the portable consumer device and the immediate transaction. In one embodiment, the cryptogram is generated by the reader. This cryptogram can also be communicated through the reader 112 interface or through manual entry through the keyboard interface on the access device 111.

Information associated with the portable consumer device, including the cryptogram is collected and forwarded to a directory server from the access device 11 through an merchant plug in (MPI). The directory server 105 can communicate through a secure network with the reader 112 coupled to the access device 112 on which the user is initiating the online purchase. The directory server 105 can be a third party server, such as an acquirer 109, a server associated with the issuer 107 of the portable consumer device, or a server associated with the payment processor, such as VISA.

In one embodiment, the directory server 105 can be part of a payment, or transaction, processing network. The processing network can include data processing subsystems, networks, and operations used to support and deliver authorization services, exception file services, and clearing and settlement services. For example, the transaction processing network may comprise a server computer, coupled to a network interface, and a database of information. An exemplary transaction processing network may include VisaNet™. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

As noted above, the transaction processing network may include a server computer. A server computer is typically a powerful computer or cluster of computers. For example, the server computer can be a large mainframe, a minicomputer cluster, or a group of servers functioning as a unit. In one example, the server computer may be a database server coupled to a Web server. The transaction processing network may use any suitable wired or wireless network, including the Internet.

In one embodiment in which the directory server 105 is associated with the payment processor and/or acquirer, a database 107 can be coupled to the server 105 in order to retrieve information associated with the portable consumer device. For instance, payment information collected from the portable consumer device can include a primary account number (PAN), which can be a 16 digit account number associated with a bank account with an issuer. In alternative embodiments, the payment information can include a first identifier, which is associated with the PAN, such as a temporary PAN, email address, phone number, etc. The PAN, or first identifier, can be used to determine the issuer of the portable consumer device through database including of information associated with the portable consumer device. When the issuer of the portable consumer device is known, the directory server can communicate the initial purchase notification and portable consumer device information to the issuer. This communication can also be done through a network, such as the WWW or through a cellular network.

An "issuer" 107 is typically a business entity (e.g., a bank) which maintains financial accounts for the user 101 and often issues a portable consumer device such as a credit or debit card to the user.

The issuer 107 can communicate with an access control server (ACS) computer (not shown) coupled to an issuer host. The ACS can receive the payment information, check the information with the associated account of the issuer host, and perform any additional security steps to authenticate the user of the portable consumer device. When the validations step is complete, the issuer host can generate a temporary identifier, also referred to as the second identifier, and send this second identifier to the directory server. The temporary identifier can be a 16 digit number, similar to a PAN or another identifier, which is linked to the authenticated user account. The directory server 105 forwards the second identifier back to the user's access device 111. The access device 111 communicates the second identifier and other associated payment information (e.g., name, billing address, email, etc.) to the online merchant 103 through the MPI.

After receiving the second identifier and performing an initial validation of the payment information through authentication, the user can complete a purchase on the merchant website. The transaction is completed similar to that in a merchant location. The payment information is sent to an acquirer, who communicates an authorization request to a payment processing network, such as VisaNet™. In the embodiment shown in FIG. 2, the directory server 105 is part of the processing network. The processing network then communicates the transaction information and authorization request to the issuer of the portable consumer device for authorization. The authorization response from the issuer is communicated through VisaNet™ to the acquirer. The acquirer then provides the response to the merchant. In one embodiment, the acquirer is not utilized and the processing network associated with the directory server, as shown in FIG. 2, functions as the acquirer. In another embodiment, the directory server and associate payment processing network can perform all the validation and authorization steps during a transaction, such as user authentication and transaction authorization (e.g., through direct communication with the issuer). In this manner, less communication is necessary over the network, which can reduce chances of the fraudsters intercepting payment information during an online transaction.

II. Exemplary Methods

Methods according to embodiments of the invention are described with reference to FIGS. 3-4.

Figure 3:
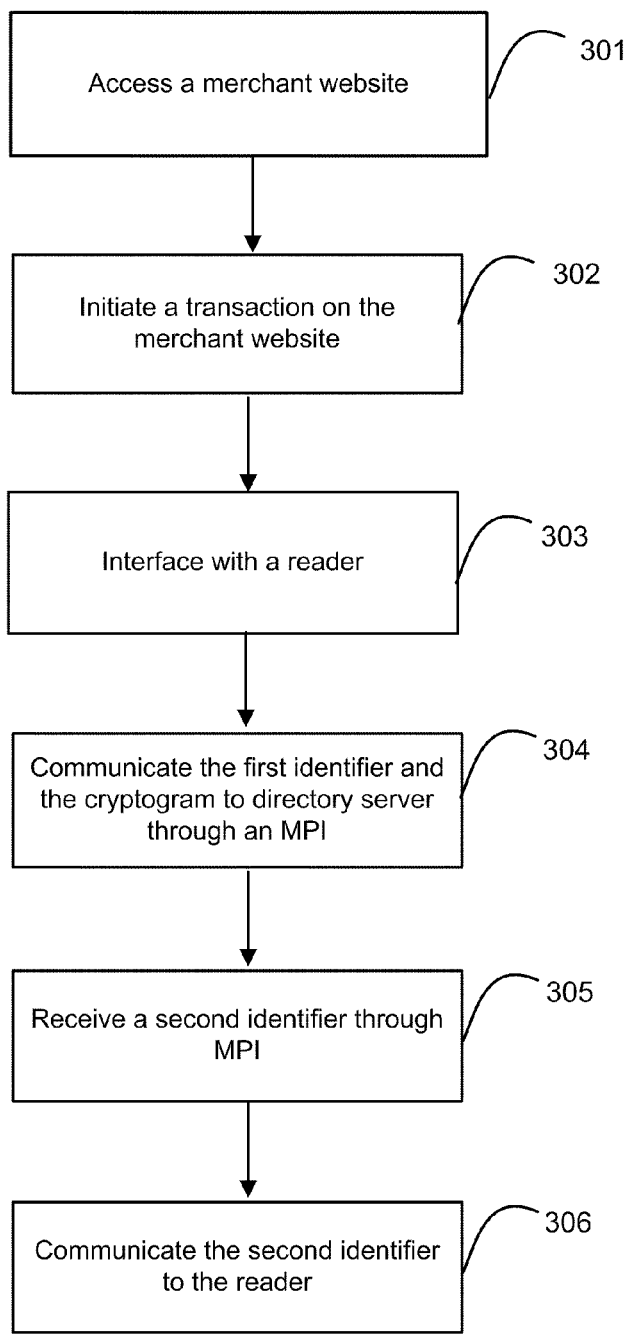
FIG. 3 shows a flowchart of a method for authenticating a transaction on an access device.

Referring to FIG. 3, a flowchart provides a method for completing a multifactor authenticated online transaction on an access device is described.

At stage 301, a user (e.g., a cardholder) communicates with an online merchant through an access device, such as a home computer. When the user begins to checkout and initializes a final purchase (i.e., a transaction) at stage 302, the merchant communicates a request to the user to enter payment information. The request can ask for manual entry through the access device or through a reader which is coupled to the access device, such as a card reader.

After the user initializes a purchase at stage 302, the user is prompted to provide their payment information. The user can bring a portable consumer device within proximity to the access device in order to transmit the information to the access device. For instance, a user may make contact with the reader, such as inserting the portable consumer device into the reader (e.g., Magstripe card), tapping the portable consumer device on the reader (e.g., chip card), or waving the card near the reader (e.g., contactless chip card).

At stage 303, the reader captures the account information and cryptogram stored on the portable consumer device. The account information and the cryptogram are then sent to the access device through a wired or wireless interface. The access device enters the information and cryptogram into the MPI. Again, the MPI can be stored on the computer readable medium of the access device or on the reader itself. The MPI can be run when the user enters the merchant website or by use of the reader or access device.

At stage 304, once the MPI obtains the portable consumer device information and the cryptogram from the reader, the MPI then communicates the information to the directory server. The MPI and the directory server can communicate through a network on a secure platform, such as through Visa's 3-D Secure protocol. The access device then waits, while the first identifier and the cryptogram are validated.

At stage 305, if the first identifier is validated by an issuer, a second identifier associated with the validated first identifier is received from the directory server by the access device. The second identifier is received through the MPI, which provides the secure communication between the access device and the directory server.

At stage 306, the MPI communicates the second identifier to the reader, which can include software used to populate the fields on the checkout page of the merchant website with the second identifier and other information needed in a transaction, such as the user's name, phone number, billing address, shipping, etc. where authorization is completed through. The transaction is then processed similar to a regular online transaction through communication between the merchant, an acquirer, a payment processing network and the issuer. However, during issuer authorization, the second identifier is compared with the second identifier provided by the issuer. If the two identifiers match, the transaction is approved. If they do not match, the transaction is denied. Accordingly, there is multi-factor authentication performed at various stages of the transaction, ensuring a secure online transaction to the user.

Figure 4:
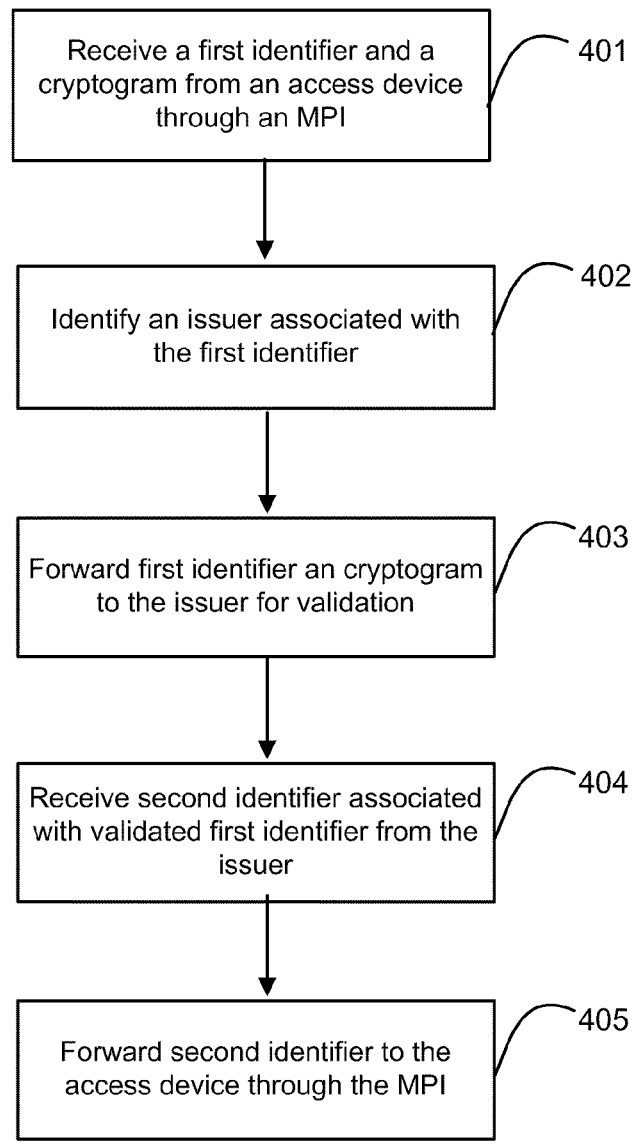
FIG. 4 shows a flowchart of a method for authenticating a transaction on a directory server.

Referring now to FIG. 4, a method for completing an authenticated transaction on a directory server is described.

At stage 401, the directory server receives data from an MPI running on an access device of a user. The MPI forms a direct communication path between the access device and the directory server over a network. The data can include data associated with an financial account of a user, such as a primary account number or other first identifier that is associated with the user's account. Additionally, the data can include a cryptogram.

At stage 402, the directory server consults a database to determine which issuer is associated with the portable consumer device. In the case where the payment information does not include the original PAN of the portable consumer device, instead including an alias, the directory server can include a lookup table. For example, if the user manually enters a PAN alias (e.g., a first identifier), such as an email or telephone number and the cryptogram, the lookup table can include the PAN and other associated card data, such as the expiration, etc., associated with that alias.

At stage 403, the directory server forwards the portable consumer device information to the issuer of the portable consumer device through an access control server (ACS) associated with the issuer. The information can include all information originally captured from the portable consumer device on the reader and, alternatively, additional information gathered from the directory server database during the issuer lookup.

Also at stage 403, a second form of authentication can also be implemented by the issuer such as a request for a passcode, (e.g., a personal identification number (PIN) associated with the portable consumer device. The passcode can be known only by the user and the issuer. As previously described, the user can be prompted to enter this information through a pop-up window on the user's web browser or other graphical user interface (GUI) which is communicated by the issuer to the user. The correct entry of a passcode by the user can cause the transaction authentication to continue and the incorrect entry can cause the transaction to be aborted.

At stage 404, the directory server receives a second identifier from the issuer host through the ACS. The second identifier is generated at the issuer host computer in order to provide an additional layer of security during the online transaction. The second identifier is associated with the authenticated user account and can be utilized to complete the transaction in order to avoid the direct communication of the user's PAN or account number to the merchant. The second identifier can also include additional security parameters, such as time limits for use, embedded cryptograms or other information.

At stage 405, the directory server forwards the second identifier to the MPI through a secure IP Gateway.

In one embodiment, the directory server, such as Visa Directory Server (VDS) can function in place of the issuer and provide the first stages (405-408) of validation of payment information. In this capacity, the issuer does not have to generate the second identifier or exchange keys with the directory server, which allow for less communication over the network and an environment less susceptible to fraud. The directory server may then forward the second identifier to the issuer for use during the final authorization of the transaction. In another embodiment, the VDS can communicate with the issuer during the authorization of the transaction to validate the second identifier so that the issuer is not responsible to maintain the second identifier or perform the validation of the identifier during authorization.

In whichever embodiment the method of FIG. 4 is implemented, two factors of authentication are required: 1) a passcode/PIN, and 2) a cryptogram. Whether both are implemented by the issuer, the payment processor (e.g., Visa), or another third party, the user and portable consumer device are dually authenticated prior to completing an online transaction. By requiring these forms of authentication, a minimal amount of the user's personal information is necessary in an e-commerce environment. This ensures a more secure online transaction over a network, and provides a similar level of authentication as performing a transaction at a merchant location.

III. Exemplary Portable Devices, Access Devices, and Computer Apparatuses

Exemplary devices used in the aforementioned systems and methods are described with reference to FIGS. 5-8.

Figure 5:
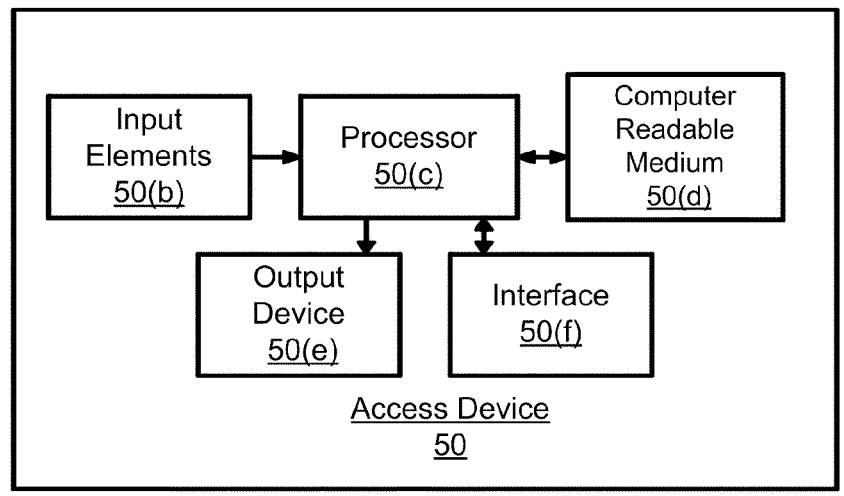
FIG. 5 shows a block diagram of an access device.

Referring now to FIG. 5, a block diagram of an access device 50, is illustrated according to an embodiment of the invention. The term access device can be utilized interchangeably with terminal, point of sale (POS) device or terminal, The access device 50 comprises a processor 50(c) operatively coupled to a computer readable medium (CRM) 50(d) (e.g., one or more memory chips, etc.), input elements 50(b) such as buttons or the like, an output device 50(e) (e.g., a display, a speaker, etc.) and one or more interfaces 50(f). In one embodiment, the access device 50 includes only a reader, processor, CRM and interface. A housing can house one or more of these components. The computer readable medium 50(d) can comprise instructions or code, executable by a processor. The CRM may additionally store the MPI software capable of communicating card information through the network to the directory server and the merchant. The one or more interfaces 50(f) can be a wired or wireless interfaces capable of communication with the reader. In another embodiment, interface 50(f) can be a network interface for direct communication with an acquirer, the directory server, the merchant, or issuer.

Figure 6:
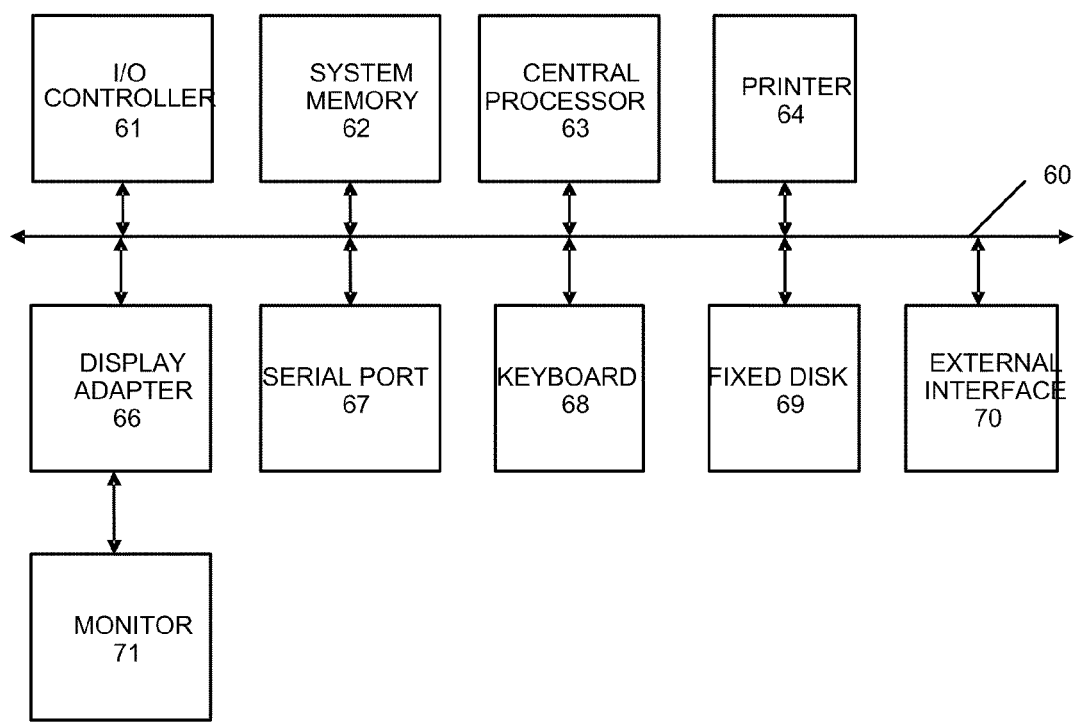
FIG. 6 shows a block diagram of a computer apparatus.

Referring now to FIG. 6 the various participants and elements (e.g., the issuer, the directory server, payment processing network, the IP Gateway, the merchant, the acquirer, and the user computer) in FIGS. 1, 2, can operate one or more computer apparatuses (e.g., a server computer) to facilitate the functions described herein. Any of the elements in FIGS. 1, 2 can use any suitable number of subsystems to facilitate the functions described herein. Examples of such subsystems or components are shown in FIG. 6. The subsystems shown in FIG. 6 are interconnected via a system bus 60. Additional subsystems such as a printer 64, keyboard 68, fixed disk 69 (or other memory comprising computer readable media), monitor 71, which is coupled to display adapter 66, and others are shown. Peripherals and input/output (I/O) devices, which coupled to I/O controller 61, can be connected to the computer system by any number of means known in the art, such as serial port 67. For example, serial port 67 or external interface 70 can be used to connect the computer apparatus to a wide area network such as the Internet, a mouse input device, or a scanner. The interconnection via system bus allows the central processor 63 to communicate with each subsystem and to control the execution of instructions from system memory 62 or the fixed disk 69, as well as the exchange of information between subsystems. The system memory 62 and/or the fixed disk 69 can embody a computer readable medium.

Figure 7:
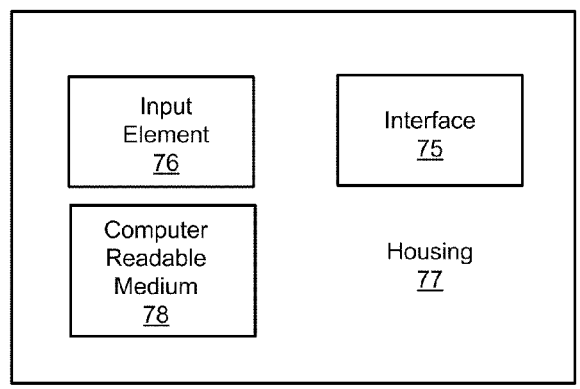
FIG. 7 shows a block diagram of a reader.

Referring now to FIG. 7, a reader is illustrated in one embodiment. The reader may include an interface 75 (e.g., Universal Serial Bus (USB) connector, wired connection, etc.), input element (chip card reader, Magstripe reader, barcode scanner, etc.) 76, a housing 77, and a computer readable medium (CRM) 78. In one embodiment, the reader is capable of generating a cryptogram each time a portable consumer device is read. In the case of contactless communication with the portable consumer device, the input element 75 can be a transceiver capable of short range, or near field communication (NFC), such as an radio frequency RF transceiver, or an optical scanner. The reader can also be referred to as a card terminal or card reader.

The portable consumer devices according to embodiments of the invention may be in any suitable form. A payment device may be referred to interchangeably as a consumer device, payment device, portable device, or card. Suitable portable consumer devices may be hand-held and compact so that they fit into a consumer's wallet and/or pocket (e.g., pocket-sized). They may include smart cards, credit or debit cards, or any consumer payment device that has a communication interface, such as a contactless interface, a contact chip interface, cellular communication interface, etc. Accordingly, other examples of portable devices include cellular phones, personal digital assistants (PDAs), pagers, payment cards, security cards, access cards, smart media, transponders, and the like. The portable devices can also be debit devices (e.g., a debit card), credit devices (e.g., a credit card), or stored value devices (e.g., a stored value card).

Each portable consumer device may comprise a body, and a memory comprising a computer readable medium disposed on or within the body. The memory may store data, and may be in any suitable form including a memory chip, etc. The memory may be used to store data such as user identification or authentication information, user account information, transaction data, etc. Stored financial information may include information such as bank account information, bank identification number (BIN), credit or debit card account number information, account balance information, expiration date, consumer information such as name, date of birth, etc. Note that such data may additionally or alternatively be stored in a secure data storage element, such as secure data storage or a similar secure memory that is part of a contactless element. As described, the memory may also contain instructions which when executed by processor implement operations or processes that are part of the operation of the device or of applications installed on the device. In addition, the portable consumer device may also include a processor coupled to the memory, where greater functionality and/or security are desired. For example, the portable consumer device may include an application implemented by the processor that generates a cryptogram each time the card is in communication with a reader.

Figure 8:
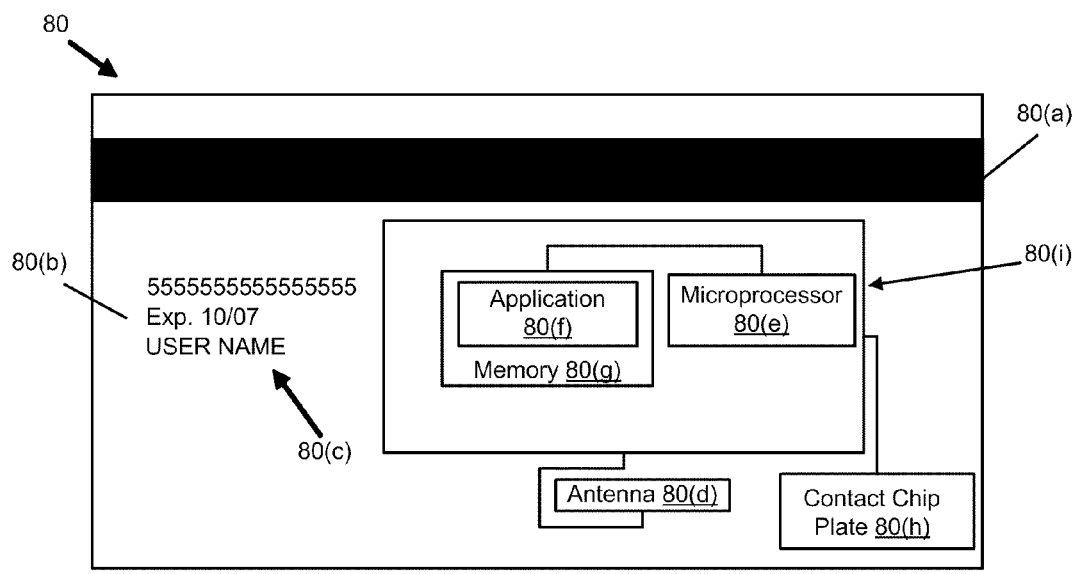
FIG. 8 shows a portable consumer device.

FIG. 8 shows one embodiment of a portable consumer device that may be used in an embodiment of the invention. The portable consumer device 80 may be in form of a credit, debit, or prepaid card having one or both of a contact interface 80(h) and a contactless interface 80(d). The contact interface 80(h), which may be in the form of a chip plate, allowing the portable consumer device 80 to perform a transaction by having the contact interface come in direct contact with a second contact interface on a reader (or other type of POS terminal or card terminal). In some embodiments, a secondary contact interface 80(a), such as a magnetic stripe can also be located on the portable consumer device 80. Stored card information 80(b) including financial data (e.g., an account number) can be sent from the card 80 to the reader when they are in contact with each other. The contactless interface 80(d) can communicate with the reader using a contactless interface at the reader. An antenna 80(d) coupled to an integrated circuit (IC) chip 80(i) may form at least part of a contactless element, which is used to wirelessly transmit the stored card information to the reader.

Specific details regarding some of the above-described aspects are provided below. The specific details of the specific aspects may be combined in any suitable manner without departing from the spirit and scope of embodiments of the invention.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method for authenticating an account of a consumer, the method comprising the steps of:
   receiving, by a directory server computer, a first identifier and a cryptogram from an access device, wherein the first identifier is associated with the account, and wherein the access device received the first identifier and the cryptogram from a portable consumer device to initiate a transaction, wherein the cryptogram was generated by the portable consumer device for the transaction;
   identifying, by the directory server computer, an issuer computer associated with the account;
   forwarding, by the directory server computer, the first identifier and the cryptogram to the issuer computer for validation;
   receiving, by the directory server computer, a temporary primary account number (TPAN) from the issuer computer, wherein the temporary primary account number (TPAN) is generated by the issuer computer and associated with a validated form of the first identifier; and
   sending, by the directory server computer, the temporary primary account number (TPAN) to the access device, wherein the temporary primary account number (TPAN) is subsequently sent by the access device to the issuer computer via an acquirer computer and a payment processing server computer for authorization of the transaction, wherein the issuer computer validates the temporary primary account number (TPAN), wherein the transaction is authorized when the temporary primary account number (TPAN) is validated, and wherein the steps in the method are performed in the order listed above.

2. The method of claim 1, wherein the first identifier includes a primary account number (PAN).

3. The method of claim 1, wherein the first identifier includes any one or more of an electronic mail address, a telephone number, a card authentication program (CAP) token, a dynamic passcode authentication (DPA) token, or a one time passcode (OTP) cryptogram.

4. The method of claim 1, further comprising:
   accessing, by the directory server computer, a lookup table to retrieve a primary account number (PAN) associated with the first identifier.

5. The method of claim 1, wherein the access device is coupled to a reader device that reads the first identifier from the portable consumer device.

6. The method of claim 5,
   wherein a third identifier is received by the issuer computer in order to continue validation of the account.

7. The method of claim 5, wherein the reader device includes a merchant plug in (MPI).

8. The method of claim 7, wherein the merchant plug in (MPI) communicates with the reader device to populate browser fields in a browser on the access device with a primary account number (PAN) and the temporary primary account number (TPAN).

9. A directory server computer for use in an authenticated transaction, the server computer comprising:
   a processor; and
   a computer readable medium coupled to the processor, the computer readable medium comprising code, executable by the processor to implement a method comprising the steps of:
   receiving a first identifier and a cryptogram from an access device, wherein the first identifier is associated with the account, and wherein the access device received the first identifier and the cryptogram from a portable consumer device to initiate a transaction, wherein the cryptogram was generated by the portable consumer device for the transaction;
   identifying an issuer computer associated with the account;
   sending the first identifier and the cryptogram to the issuer computer for validation;
   receiving a temporary primary account number (TPAN) from the issuer computer, wherein the temporary primary account number (TPAN) is generated by the issuer computer and associated with a validated form of the first identifier; and
   sending the temporary primary account number (TPAN) to the access device, wherein the temporary primary account number (TPAN) is subsequently sent by the access device to the issuer computer via an acquirer computer and a payment processing server computer for authorization of the transaction, wherein the issuer computer validates the temporary primary account number (TPAN), wherein the transaction is authorized when the temporary primary account number (TPAN) is validated, and
   wherein the steps in the method are performed in the order listed above.

10. The directory server computer of claim 9, further comprising a database, wherein the database includes information used to identify an issuer computer associated with the first identifier.

11. A non-transitory computer readable medium comprising code executable by a processor, for implementing a method comprising the steps of:
receiving a first identifier and a cryptogram from an access device, wherein the first identifier is associated with an account of a consumer, wherein the access device received the first identifier and the cryptogram from a portable consumer device to initiate a transaction, wherein the cryptogram was generated by the portable consumer device for the transaction;
identifying an issuer computer associated with the account;
forwarding the first identifier and the cryptogram to the issuer computer for validation;
receiving a temporary primary account number (TPAN) from the issuer computer, wherein the temporary primary account number (TPAN) is generated by the issuer computer and associated with a validated form of the first identifier; and
sending the temporary primary account number (TPAN) to the access device, wherein the temporary primary account number (TPAN) is subsequently sent by the access device to the issuer computer via an acquirer computer and a payment processing server computer for authorization of the transaction, wherein the issuer computer validates the temporary primary account number (TPAN), wherein the transaction is authorized when the temporary primary account number (TPAN) is validated, and
wherein the steps in the method are performed in the order listed above.

12. A method for authenticating a transaction on an access device, the method comprising the steps of:
accessing, by an access device, a merchant website;
initiating the transaction on the merchant website, wherein the merchant sends a request for payment during the transaction;
interfacing with a reader device associated with the access device, wherein the reader device captures a first identifier stored on a portable consumer device and a cryptogram in response to the request for payment, wherein the cryptogram was generated by the portable consumer device for the transaction;
forwarding, by the access device, the first identifier and the cryptogram to a directory server computer through a merchant plug in, wherein the directory server computer communicates the first identifier and the cryptogram to an issuer computer of the portable consumer device for validation; and
receiving, by the access device, a temporary primary account number (TPAN) through the MPI, wherein the temporary primary account number (TPAN) is generated by the issuer computer and associated with the validated first identifier,
wherein the temporary primary account number (TPAN) is subsequently sent by the access device to the issuer computer via an acquirer computer and a payment processing server computer for authorization of the transaction, wherein the issuer computer validates the temporary primary account number (TPAN), wherein the transaction is authorized when the temporary primary account number (TPAN) is validated, and
wherein the steps in the method are performed in the order listed above.

13. The method of claim 1, wherein the portable consumer device is configured to receive a personal identification number from the consumer prior to generating a new cryptogram for each transaction conducted using the portable consumer device.

14. The method of claim 13, wherein the access device displays a pop-up window generated by the issuer computer, allowing the consumer to input a password, after forwarding, by the directory server computer, the first identifier and the cryptogram to the issuer computer for validation.

15. The method of claim 14, wherein the issuer computer is an access control server computer.

16. The method of claim 1, wherein the first identifier is an alias corresponding to a personal account number (PAN).

17. The method of claim 14, wherein if the password is incorrect the consumer's online transaction session can timeout and the transaction can be terminated.

18. The method of claim 1, wherein the temporary primary account number (TPAN) is not validated when the temporary primary account number (TPAN) forwarded by the merchant does not match the temporary primary account number (TPAN) previously generated by the issuer computer.

19. The method of claim 1, wherein a reader device coupled to the access device generates the cryptogram received from the access device for the transaction.

20. The method of claim 1, wherein the cryptogram is entered manually through an interface on the access device.

* * * * *